Patented Feb. 24, 1925.

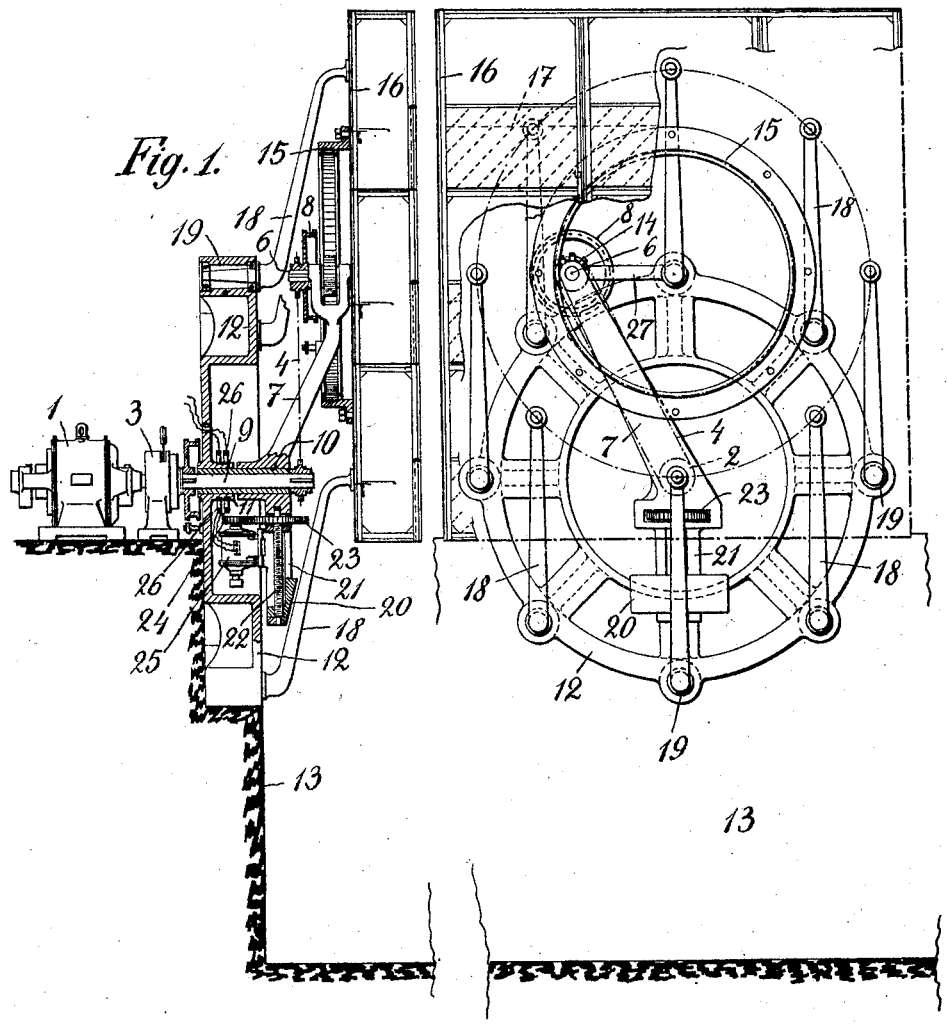

1,527,812

UNITED STATES PATENT OFFICE.

LORENZ MECKL, OF KIEL-GAARDEN, GERMANY.

DEVICE FOR POPULAR AMUSEMENT.

Application filed October 4, 1923. Serial No. 666,633.

*To all whom it may concern:*

Be it known that I, LORENZ MECKL, workmaster, a citizen of the German Republic, residing at Kiel-Gaarden, in the State of Prussia, Germany, have invented certain new and useful Improvements Relating to a Device for Popular Amusement, of which the following is a specification.

The present invention relates to a device for popular amusement, and consists in the combinations and arrangements of elements hereinafter disclosed and set forth in the accompanying claims.

This invention comprises a framework in which are arranged a series of seats for passengers, the frame work being supported in such a manner as to be capable of receiving a gyratory motion from suitable driving mechanism while remaining at all times in a horizontal position.

The features of my invention, and the important structural elements characterizing the preferred embodiment which is illustrated as an example, will be more particularly explained in the specific description hereinafter to be given.

Reference is to be had to the accompanying drawing forming a part of this specification, in which similar characters of reference indicate corresponding parts in the several views.

Figure 1 is a side elevation of the device, partly in section; and Figure 2 is a front elevational view of the device with parts of the frame work omitted for clearness.

Referring to the construction in further detail, the same consists of an electric motor 1, the driving axle of which is connected with a chain-pulley 2 by means of a transmission gearing 3. The latter serves for changing the speed and direction of the movements in any well known manner. A sprocket chain 4 indicated by dotted lines runs over the pulley 2 and over a sprocket wheel 5 on a shaft 6, which is mounted on the outer end of a forked arm 7. The sprocket wheel 5 is connected with a brake-mechanism 8 for stopping the device. For the same purpose, a similar brake-mechanism is arranged on the axle 9, which is mounted in a collar 10. This collar with the axle 9 is mounted in a bearing 11 arranged in the centre of a circular disc 12, the latter being attached to a vertical wall 13.

To the axle 6 is keyed a pinion 14 meshing with the inner teeth of a ring 15, which is fastened by means of screws to the backside of a frame work 16 having three ranges of seats 17 one above the other for the passengers. For carrying the frame work, eight crank-levers 18 are provided, which are mounted with trunnions and ball-bearings 19 in the disc 12. The connection of the crank-levers 18 with the frame work is performed in like manner.

For balancing the weight of the frame work, a counter-weight 20 is arranged to an arm 21, this arm being in rigid connection with the arm 7. The counter-weight 20 slides in a guide of the arm 21 and may be moved radially by means of a screw-spindle 22. For this purpose, the counter-weight is developed as a nut of screw. Further a toothed wheel 23 is fastened to the spindle 22 and meshing with a toothed wheel 24, which is fixed to the axle of an electric motor 25. This motor is attached to the arm 21. The supplying of the electric current to the motor 25 is performed by means of contact-brushes 26 sliding in usual manner on insulated metal-rings. As seen in Fig. 2, the turning-points 19 of the crank-levers 18 are placed in a circle, in the centre of which are arranged the axle 9 and the turning-point of the arm 7. The outer end of this arm is connected by a guide-bar 27 with a trunnion on the frame work concentric with the toothed ring 15.

The operation of the described device is as follows:

By energizing the electric motor 1, the frame work 16 is rotated about the centre of the axle 9 in a direction corresponding to the sense and the velocity of the rotation of the said motor. By means of the transmission gearing 3 the direction and the velocity of the rotation may be changed. When the direction of the motion is frequently reversed, the frame work will be given an oscillating motion about the center but during this movement the frame work remains at all times in a horizontal position.

Owing to the swinging arrangement of the driving mechanism 2, 4, 5, and the connection of the arm 7 with the center of the ring 15 by the lever 27, the interlocking of the pinion 14 with the inner teeth of the ring 15 will be secured in each position of the frame work. The weight of the latter constantly is balanced by the counter-weight 20, and the position of this counterweight may be adjusted by means of the electric-motor 25 and the screw-spindle 22. It is obvious that those skilled in the art may vary the details of construction and arrangement of parts without departing from the spirit of my invention, and therefore I do not wish to be limited to such features except as may be required by the claims.

Having thus described my invention, what I claim as new, and desire to secure by Letters Patent, is:

1. A mechanical device comprising a stationary support, a movable frame work, a plurality of crank levers connecting said support and frame work arranged to permit an orbital movement of the latter, a toothed ring fixed to said frame work, an arm rotatably mounted on said support a pinion journaled on said arm, means for holding said pinion in engagement with said ring, and means for driving said pinion thereby imparting an orbital movement to said frame work.

2. A device for popular amusement comprising a stationary support, a passenger carrying frame work, crank levers connecting said frame work and said support arranged to permit an orbital movement of the former with respect to the latter, a rotative arm journaled on said support, a pinion journaled on said arm, means for holding said pinion in engagement with said ring, and means for rotating said pinion thereby imparting an orbital movement to said frame work.

3. A mechanical device comprising a stationary support, a movable frame work, a plurality of cranks connecting said frame work to said support, said cranks permitting an orbital movement of said frame work, a toothed ring on said frame work, a rotative arm journaled on said support, a second arm connected to said first mentioned arm and journaled on said frame work at a point concentric with said toothed ring, a pinion journaled on one of said arms, and engaging with said toothed ring, and a counterweight on said rotative arm arranged on the opposite side of the journaled connection thereof to said stationary support from the concentric point on said frame work.

4. A mechanical device comprising a stationary support, a movable frame work, a plurality of crank levers connecting said frame work to said support and permitting an orbital movement of the former, a rotative arm journaled on said support and also on said movable frame work, a toothed ring concentric with the pivotal mounting on said frame work, a pinion carried by said arm engaging said toothed ring, a counterweight adjustably connected with said rotative arm diametrically opposite to said pivotal mounting on said frame work, and means for adjusting the position of said counterweight.

5. A mechanical device comprising a fixed support, a plurality of trunnions arranged in a circle upon said support, a movable frame work, a plurality of trunnions thereon arranged similarly to said first mentioned trunnions, a plurality of cranks connecting the trunnions on said support and frame work respectively, a toothed ring on said frame work concentric with the trunnions thereon, a pinion engaging said ring, a rotatable arm carrying said pinion journaled on said support, a second arm connecting said first mentioned arm to said frame work, and means for rotating said pinion thereby imparting a rotative movement to said rotative arm and an orbital movement to said frame work.

In testimony whereof I affix my signature in presence of two witnesses.

LORENZ MECKL.

Witnesses:
MAX HANDKE,
RUDOLPH HOLTENBERG.